July 5, 1932.  J. P. TARBOX  1,865,487

VEHICLE BODY STRUCTURE

Filed Sept. 3, 1929

INVENTOR.

Patented July 5, 1932

1,865,487

UNITED STATES PATENT OFFICE

JOHN P. TARBOX, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA

VEHICLE BODY STRUCTURE

Application filed September 3, 1929. Serial No. 390,088.

The invention relates to vehicles and more particularly to an improved construction in metal vehicle bodies.

The present invention is particularly adaptable to that type of automobile body constructed from a plurality of sheet metal panels. These panels are shaped to the desired contour to form the main units of the body and are welded together at their meeting edges to form an integral steel body structure.

The invention provides for an improvement in the construction of those portions of the sheet panels adjacent the edges to be secured together so as to effect butt welding along such edges in a more efficient and expeditious manner.

According to the present invention the sheet metal panels are fabricated in suitable shapes so that in the assemblage of the structure the portions of the panels adjacent both sides of the edges to be secured together will be disposed in transverse alignment. By means of this novel construction these adjacent portions will be in equilibrium under co-axial forces during the application of butt-welding pressure.

This construction will effect a neat joint which is strong and rigid. It will minimize any undesired strains in the panels and will obviate the slipping of the abutting edges from their registered relationship during welding operations.

Outstandingly the invention has also for its object a division of the parts of the coupé which greatly facilitate joinder together by the flash welding method.

Various other features and advantages of the invention will be apparent from the following description and from an inspection of the accompanying drawing.

In the accompanying drawing there is shown for purposes of illustration, one form of construction embodying the invention, in which Fig. 1 shows the perspective of an automobile tonneau body assembly.

Like reference characters denote like parts in the several figures of the drawing.

In the following description and in the claims, parts will be identified by specific names for convenience, but they are intended to be as generic in their application to similar parts as the art will permit.

Figure 1:
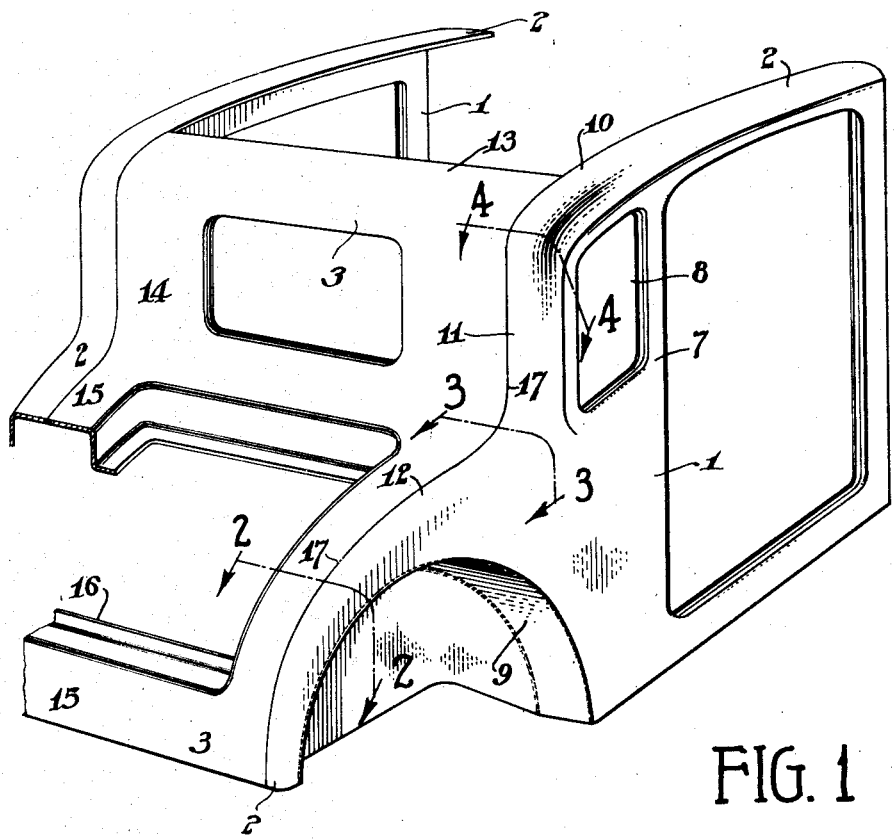
Figure 2:
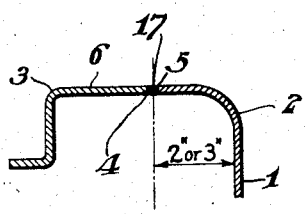
Fig. 2 is a section taken on line 2—2 of Fig. 1.
Figure 4:
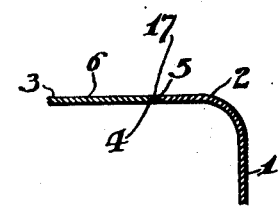
Fig. 4 is a section taken on line 4—4 of Fig. 1.

Referring more particularly to the accompanying drawing, there is shown the adaptation of the present invention to an automobile coupé body assemblage in which 1 represents a pair of companion side panels provided with flanges 2 extending throughout the full length of their top and rear edge. These flanges 2 are two to three inches wide and have transverse rectilineal sides which are held in transverse aligned relationship to each other. Joining together the edges of these flanges is a rear panel member 3 which is so convoluted as to register its side edges 4 with the edges 5 of the flanges 2. The portions 6 adjacent the side edges 4 of the rear panel and the flanges 2, each have transversely rectilinear sections in alignment with each other throughout, as clearly delineated in Figs. 2 and 4.

So constructed, the rear panel 3 and the side panels 1 are flash welded together by direct relative transverse movement. That is to say, the approach of the parts in the process of flash welding is approximately perpendicular to the longitudinal plane of symmetry of the body. Under such conditions the burning off incident to the flash welded joint takes place in metal transversely rectilinear in all sections, and is therefore uniform. So also, in the final pushing up of the parts immediately following the cutting off of the welding current the heavy pressure finds the parts directly opposed to each other and normal to the plane of symmetry in all sections, whereby there are introduced no bending moments which can slip joint and mis-match the parts or otherwise distort them.

Figure 3:
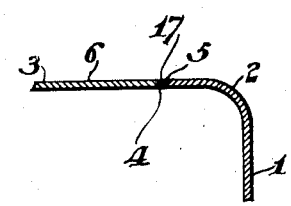
Fig. 3 is a section taken on line 3—3 of Fig. 1.

The side stampings 1 comprehend the entire side of the body in the rear of the rear door post 7 and including the rear quarter window 8, the wheel housing 9, the rear roof quarter 10, the vertically extending rear quarter wall 11 and the quarter portion 12 of the deck paneling. The rear stamping 3 comprehends the top rear quarter 13 of the roof, the upper back paneling 14 and the entire body of the top deck paneling 15, which latter contains the deck lid opening 16 within its margins. The flash welded seam 17 between these parts is continuous, is as shown disposed in a vertical plane parallel to the longitudinal plane of symmetry, and is of a character throughout that described and shown in Figs. 2 to 4.

The generic spirit of the invention may be given expression in other terms than those used in the annexed claims and probably in a considerable number of modifications, all of which should be comprehended within the claims, irrespective of their expression.

What I claim is:

1. A coupé body comprising a one piece side panel comprehending rear door post, rear roof quarter panel, rear quarter panel, rear side panel and deck quarter panel flash welded along the inner edges of the quarters to a rear panel comprehending in a one piece stamping the rear quarter roof panel, the upper back panel and the deck panel.

2. A coupé body comprising a one piece side panel comprehending rear door post, rear roof quarter panel, rear quarter panel, rear side panel and deck quarter panel flash welded along the inner edges of the quarters to a rear panel comprehending in a one piece stamping the rear quarter roof panel, the upper back panel and the deck panel, said panels being flash welded together in a plane substantially parallel to the longitudinal plane of symmetry of the vehicle and between the deck opening and the vertical sides of the body.

3. A coupé body comprising a one piece side panel comprehending rear door post, rear roof quarter panel, rear quarter panel, rear side panel and deck quarter panel flash welded along the inner edges of the quarters to a rear panel comprehending in a one piece stamping the rear quarter roof panel, the upper back panel and the deck panel, the edges of said stampings on both sides of the flash welded joint having throughout transverse sections rectilinearly extending substantially perpendicular to the longitudinal plane of symmetry of the vehicle.

4. A coupé body comprising a one piece side panel including a portion of the side quarter of the roof, the rear quarter extending vertically and the horizontal deck quarter, and having its upper marginal portion extending inwardly in a transverse direction and flash welded to a rear transverse panel formed in a one piece stamping extending over the rear roof quarter, the rear vertical portion and the deck portion merging into said rear vertical portion.

In testimony whereof I hereunto affix my signature.

JOHN P. TARBOX.